S. ROSS.

Assignor to ROSS, DAVIS & CO.

Machine for Beating Out and Molding the Soles of Boots and Shoes.

No. 8,421. Reissued Sept. 17, 1878.

Attest,
H. L. Perrine
A. H. Norris

Simon Ross.
Inventor.
Per James L. Norris.
Atty.

N. PETERS, PHOTO-LITHOGRAPHER, WASHINGTON, D. C.

UNITED STATES PATENT OFFICE.

SIMON ROSS, OF CINCINNATI, OHIO, ASSIGNOR TO ROSS, DAVIS & CO., OF SAME PLACE.

IMPROVEMENT IN MACHINES FOR BEATING OUT AND MOLDING THE SOLES OF BOOTS AND SHOES.

Specification forming part of Letters Patent No. 177,355, dated May 16, 1876; Reissue No. 8,421, dated September 17, 1878; application filed May 21, 1878.

*To all whom it may concern:*

Be it known that I, SIMON ROSS, of Cincinnati, in the county of Hamilton and State of Ohio, have invented certain new and useful Improvements in Machines for Beating Out and Molding Soles of Boots and Shoes, of which the following is a specification:

My invention relates to machines for beating out and molding soles used in the manufacture of boots and shoes.

The object of my invention is to employ a piston carrying a former, operated preferably by compressed air, so as to give an elastic blow by a direct stroke of the piston to shape and beat out the soles between two formers, one moving on the piston and the other stationary, so as to receive the blow of the piston.

My object is, secondly, to so arrange the parts that the piston will, after giving its blow or stroke, when the pressure is released, return to its original position by gravity. By this means the machine is much more simple and effective than when joints, levers, and springs are used.

My invention consists, first, in the employment of two formers, one stationary and attached to a suitable beam for receiving the stroke of the piston, and the other former or mold attached directly to the piston-head, so that a short movement of the piston will bring the male and female formers into direct contact.

My invention consists, secondly, in arranging the piston carrying a mold for shaping the soles vertically under the stationary mold, so that when the pressure employed to drive the piston is released the piston will return by gravity to its position ready for a second stroke.

My invention consists, thirdly, in a beating-out machine the frame or structural part of which is a hollow column, the exterior of which supports and sustains the operative parts of the machine, and the interior of which forms a chamber or reservoir for storing an elastic medium under pressure, which is compressed by suitable mechanism and employed to operate the piston to do the shaping.

Figure 1:
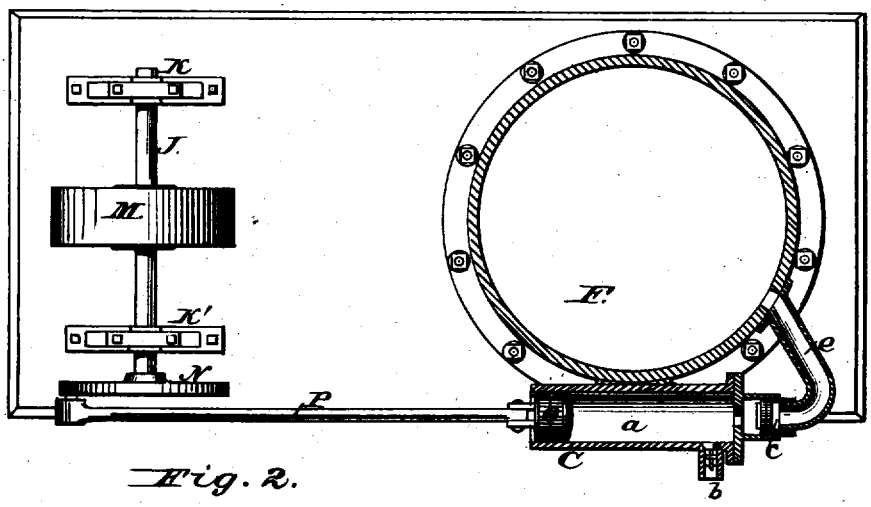
Figure 2:
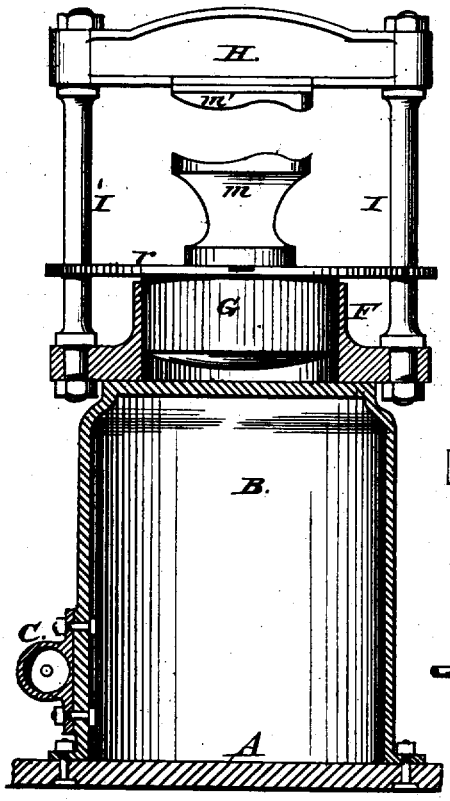
Figure 3:
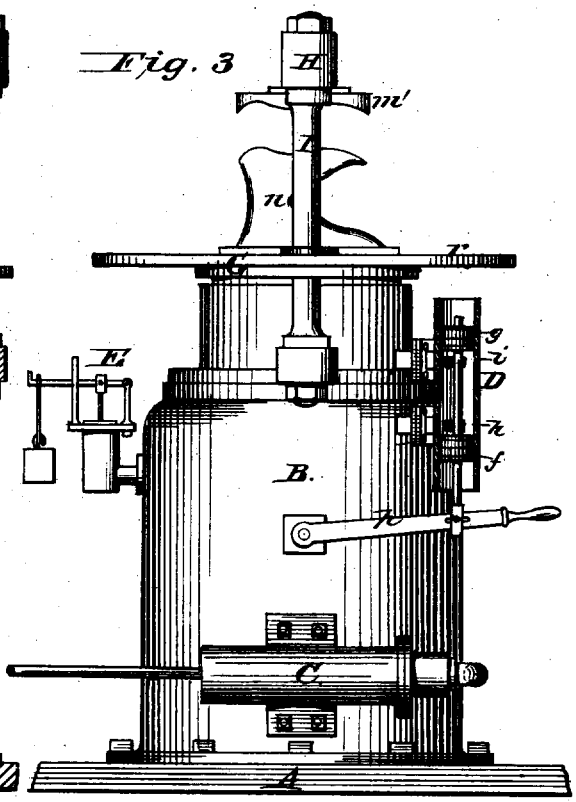

In the accompanying drawings, Figure 1 is a sectional plan view of a machine embodying my invention. Fig. 2 is a transverse sectional elevation of the same; and Fig. 3, a longitudinal elevation, with the regulating-valve chamber in section, and with part of the bed-plate and driving machinery removed.

The piston and formers are shown attached to an air-chamber and operated by an air-pump and a cut-off valve, which I will proceed to describe.

On the bed-plate A, at one end, is mounted an air-chamber, B, upon which are mounted the air-pump C, regulating-valve chamber D, safety-valve E, cylinder F, piston G, arch bar or beam H, guide-bars I and I′, and the molds or formers used in the shaping of the material under pressure; and on the other end of the bed-plate A the driving machinery is fixed, consisting of a shaft, J, running in journals K and K′, to which are attached the driving-pulley M and crank-plate N. The air-pump C consists of a piston, O, cylinder *a*, and valves *b* and *c*, the valve *b* opening inwardly for the admission of air when the piston is moving outwardly, and the valve *c* remains closed. During the piston's return the valve *b* is closed and the valve *c* is open, and allows the air to pass through the ejection-pipe *e* into the air-chamber B, which communicates with the valve-chamber D, in which are two connected pistons, *f* and *g*, arranged a suitable distance apart, and fitting the chamber D in such a manner as to be air-tight. The piston *f* remains below the opening *h*, that communicates with the valve-chamber D and air-chamber B, and is so arranged as to confine the air in the chambers B and D when the piston *g* cuts off communication between the said chamber and cylinder F, or until the pressure is sufficient to raise the safety-valve E. When the piston *g* is located above the opening *i* the air is free to pass into the cylinder F at a point below the piston G, raising the said piston, and with it the mold *m*, upon which is placed the material to be pressed, until the molds *m* and *m′* are brought forcibly together, in which position they will be retained until the piston *g* is moved by the lever *p* to a point below the opening *i*. The air is then free to escape through the top of the chamber D, and the piston G, being relieved from pressure, descends easily until its top flange *r* rests upon the top of the cylinder F. The arch-bar H is supported and held in position by the guide-bars I and I′.

The flange *r*, which is a part of the piston G, is arranged to fit the guide-bars I and I′ in such a manner as to steady the piston G while it is moving in the cylinder F.

The machine can be changed from a molding to a beating-out machine by removing the molds *m* and *m′* and replacing them by the last *n* and mold *n′*, as shown in Fig. 2. The change can be readily made, as the molds and lasts are all fitted with a male dovetail slide, and the piston G and arch-bar H with corresponding female slides, so arranged as to locate the molds or lasts in the center of the machine.

I claim—

1. In a machine for beating out and molding soles for boots and shoes, the combination of two formers, one stationary and attached to a suitable beam for receiving the stroke, and the other attached to the end of a piston-rod, the other end of which is attached to a piston arranged in a suitable cylinder and driven by elastic-fluid pressure, and a suitable mechanism for controlling the elastic fluid, and connected with the said cylinder for that purpose, substantially as described.

2. In a shoe-sole-shaping machine, the combination of the stationary former and a reciprocating former attached to a piston-rod, arranged directly under and adapted to be driven upward toward said stationary former by elastic-fluid pressure, and when the pressure employed to drive said piston-rod is removed it will return by gravity to its normal position, ready for another stroke.

3. A beating-out and molding machine having its frame or structural part composed of a hollow column, the exterior of which supports the operative parts of the machine, and the interior of which forms a chamber or reservoir for storing an elastic fluid, which is compressed therein by suitable mechanism, and held under pressure to operate the piston by which the beating and molding are effected.

4. The combination of an air-chamber, B, valve-chamber D, fitted with valves *f* and *g*, cylinder and piston F and G, on the cylinder G of which is fixed a mold, *m*, operating against an upper fixed mold, *m′*, by means of an air-pump, C, substantially as and for the purpose specified.

Witness my hand this 11th day of May, 1878.

SIMON ROSS.

Attest:
E. E. WOOD,
C. W. GALAGHER.